(12) United States Patent
Barnett et al.

(10) Patent No.: US 11,190,227 B2
(45) Date of Patent: *Nov. 30, 2021

(54) EXPANDABLE DEVICE FOR A PORTABLE ELECTRONIC DEVICE

(71) Applicant: PopSockets LLC, Boulder, CO (US)

(72) Inventors: David B. Barnett, Boulder, CO (US); Greg Adelman, Boulder, CO (US); Michael J. Kory, Boulder, CO (US); Randy Yang Chiang, Boulder, CO (US); Altan Nahum, Boulder, CO (US); David F. Willson, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,271

(22) Filed: Aug. 10, 2020

(65) Prior Publication Data

US 2020/0373956 A1 Nov. 26, 2020

Related U.S. Application Data

(63) Continuation of application No. 16/422,176, filed on Feb. 24, 2019, now Pat. No. 10,742,251, which is a
(Continued)

(51) Int. Cl.
*H04B 1/3877* (2015.01)
*G06F 1/16* (2006.01)
(Continued)

(52) U.S. Cl.
CPC ......... *H04B 1/3877* (2013.01); *A44B 99/005* (2013.01); *A45F 5/00* (2013.01);
(Continued)

(58) Field of Classification Search
CPC ............... A44B 99/005; A45F 2200/15; A45F 2005/026; A45F 5/00; A45F 5/10;
(Continued)

(56) References Cited

U.S. PATENT DOCUMENTS 6,371,345 B1 * 4/2002 Leyden ................... B60R 11/02
224/553
8,737,066 B1 * 5/2014 Block ....................... A45F 5/00
224/217

(Continued)

*Primary Examiner* — Timothy J Thompson
*Assistant Examiner* — Rhadames Alonzo Miller
(74) *Attorney, Agent, or Firm* — Irell and Manella, LLP (57) ABSTRACT

An expandable device for use with a portable electronic device includes a body, a button, a platform, and a locking device. The body has a first end, a second end, and a longitudinal axis, and is movable between an expanded configuration and a collapsed configuration. The button is coupled to the first end of the body, and the platform includes an outer surface and a collar extending away from the outer surface. The collar defines a cavity. The locking device is carried by the second end of the body, and at least a portion of the locking device is adapted to be removably disposed in the cavity of the platform for releasably coupling the body to the platform. The locking device is rotatable relative to the platform between an unlocked configuration, in which the body is removable from the platform, and a locked configuration, in which the body is secured to the platform.

17 Claims, 9 Drawing Sheets

Related U.S. Application Data continuation of application No. 15/993,458, filed on May 30, 2018, now Pat. No. 10,348,352.

(60) Provisional application No. 62/589,068, filed on Nov. 21, 2017, provisional application No. 62/582,912, filed on Nov. 7, 2017.

(51) Int. Cl.
| | | |
|---|---|---|
| *H04M 1/04* | (2006.01) | |
| *A44B 99/00* | (2010.01) | |
| *A45F 5/00* | (2006.01) | |
| *F16M 11/04* | (2006.01) | |
| *F16M 11/38* | (2006.01) | |
| *F16M 13/00* | (2006.01) | |
| *F16M 13/02* | (2006.01) | |
| *F16M 13/04* | (2006.01) | |
| *A45F 5/10* | (2006.01) | |
| *H04M 1/02* | (2006.01) | |
| *A45F 5/02* | (2006.01) | |
| *A45C 11/00* | (2006.01) | |

(52) U.S. Cl.
CPC ............. *A45F 5/10* (2013.01); *F16M 11/041* (2013.01); *F16M 11/38* (2013.01); *F16M 13/00* (2013.01); *F16M 13/022* (2013.01); *F16M 13/04* (2013.01); *G06F 1/1632* (2013.01); *H04M 1/04* (2013.01); *A45C 2011/001* (2013.01); *A45C 2011/002* (2013.01); *A45C 2200/15* (2013.01); *A45F 2005/026* (2013.01); *A45F 2200/0508* (2013.01); *A45F 2200/0516* (2013.01); *H04M 1/0283* (2013.01)

(58) Field of Classification Search
CPC ... F16M 11/041; G06F 1/1632; H04B 1/3877; H04M 1/0283; H04M 1/04
See application file for complete search history.

(56) References Cited

U.S. PATENT DOCUMENTS

| | | | |
|---|---|---|---|
| 9,267,638 B2* | 2/2016 | Gette | F16M 13/00 |
| 9,367,090 B2* | 6/2016 | Barnett | G06F 1/1626 |
| 9,663,976 B2* | 5/2017 | Evans | E05B 73/00 |
| 9,787,348 B2* | 10/2017 | Srour | H04B 1/3888 |
| 9,872,544 B2* | 1/2018 | Ho | F16B 21/04 |
| 9,958,107 B1* | 5/2018 | Hobbs | F16M 11/40 |
| 9,991,581 B2* | 6/2018 | Taptic | H01Q 1/084 |
| 2004/0113036 A1* | 6/2004 | Gilbert | B42F 9/001 |
| | | | 248/346.01 |
| 2009/0168308 A1* | 7/2009 | O'Brien | B60R 11/02 |
| | | | 361/679.01 |
| 2010/0155550 A1* | 6/2010 | Weiss-Vons | B65H 75/143 |
| | | | 248/206.3 |
| 2011/0192857 A1* | 8/2011 | Rothbaum | B25F 1/00 |
| | | | 220/694 |
| 2012/0113572 A1* | 5/2012 | Gaddis, II | G06F 1/1628 |
| | | | 361/679.01 |
| 2012/0329534 A1* | 12/2012 | Barnett | F16M 11/10 |
| | | | 455/575.8 |
| 2013/0026329 A1* | 1/2013 | Lane | A47B 23/043 |
| | | | 248/459 |
| 2013/0146625 A1* | 6/2013 | Karie | A45F 5/00 |
| | | | 224/217 |
| 2014/0097306 A1* | 4/2014 | Hale | G03B 17/566 |
| | | | 248/122.1 |
| 2014/0221058 A1* | 8/2014 | Jand | A45C 11/00 |
| | | | 455/575.8 |
| 2014/0263939 A1* | 9/2014 | Rinner | F16M 11/10 |
| | | | 248/688 |
| 2014/0326852 A1* | 11/2014 | Gette | F16M 11/10 |
| | | | 248/688 |
| 2015/0305465 A1* | 10/2015 | Barker | A45F 5/02 |
| | | | 150/104 |
| 2016/0197636 A1* | 7/2016 | Brand | H04B 1/3888 |
| | | | 455/575.8 |
| 2016/0209733 A1* | 7/2016 | Akai | F16M 11/041 |
| 2017/0349116 A1* | 12/2017 | Liao | G06F 1/181 |
| 2017/0359095 A1* | 12/2017 | Fleckenstein | F16M 11/041 |
| 2019/0281715 A1* | 9/2019 | Bautista | H05K 5/0234 |

\* cited by examiner

EXPANDABLE DEVICE FOR A PORTABLE ELECTRONIC DEVICE

CROSS-REFERENCE TO RELATED APPLICATIONS

This is a continuation of U.S. patent application Ser. No. 16/422,176, filed on May 24, 2019, which claims priority to U.S. patent application Ser. No. 15/993,458, filed on May 30, 2018, which issued on Jul. 9, 2019 under U.S. Pat. No. 10,348,352, which claims priority to U.S. Provisional Patent Application Ser. No. 62/582,912, filed on Nov. 7, 2017, and to U.S. Provisional Patent Application Ser. No. 62/589,068 filed on Nov. 21, 2017. The entire contents of each of the foregoing are incorporated herein by reference.

FIELD OF DISCLOSURE

The present disclosure relates generally to an device and, more particularly, to expandable devices that can be attached to portable electronic devices or cases for portable electronic devices and used as grips, stands, or for other purposes.

BACKGROUND

Portable electronic devices, such as MP3 players and smart phones, are often housed in protective covers or cases in order to protect the device from damage, provide a grip for handling the device, and/or provide a stand for propping the device on a surface. Such cases increase the effective size of the device. Expandable devices and accessories, which may be attached directly to the device or to the case protecting the device, are used for a variety of functions, including propping the device on a surface and providing an expandable grip for handling the device. The expandable devices have decorative buttons, which may display logos, decals, symbols, or other artistic renderings.

SUMMARY

One aspect of the present disclosure is directed to an expandable device for use with a portable electronic device. The expandable device includes a body, a button, a platform, and a locking device. The body includes a first end, a second end, and a longitudinal axis, the body movable between an unexpanded configuration and a collapsed configuration. The button is coupled to the first end of the body. The platform includes an outer surface and a collar extending away from the outer surface, the collar defining a cavity. The locking device is carried by the second end of the body, and at least a portion of the locking device is adapted to be removably disposed in the cavity of the platform for releasably coupling the body to the platform. The locking device is rotatable relative to the platform between an unlocked configuration, in which the body is removable from the platform, and a locked configuration, in which the body is secured to the platform.

In some aspects, the button includes an inner surface and an engaging member carried by the inner surface, and when the body is in the collapsed configuration, the engaging member of the button engages the locking device such that the button and the locking device can rotate together.

In some aspects, the locking device includes a connecting disk and a hub attached to the connecting disk, the hub is coupled to the platform when the locking device is in the locked configuration and removable from the platform when the locking device is in the unlocked configuration.

In some aspects, the connecting disk is adjacent to the second end of the body, the connecting disk including a first mating surface adapted to engage the engaging member of the button and a second mating surface adapted to connect to the hub.

In some aspects, the hub includes a body having a first surface adapted to connect to the connecting disk, a second surface adapted to couple to a first portion of the platform, and a radial wing extending from the body of the hub and adapted to engage a different portion of the platform.

In some aspects, the platform includes a protrusion extending into the cavity, the protrusion adapted to couple to the second surface of the hub when the locking device is in the locked configuration.

In some aspects, the hub is configured to slide against the protrusion of the platform, and wherein the platform is configured to deform when the locking device moves between the unlocked configuration and the locked configuration.

In some aspects, the platform includes a base recessed from the collar and at least partially defining the cavity such that the cavity is disposed between the collar and the base of the platform, and wherein the protrusion is formed in the base.

In some aspects, the platform includes a shelf extending inwardly into the cavity from the collar, the shelf configured to engage the radial wing of the hub when the locking device is in the locked configuration.

In some aspects, the radial wing of the hub is disposed beneath the shelf of the platform when the locking device is in the locked configuration.

In some aspects, at least one of the base of the platform and a portion of the hub is a resilient material and is deformable, wherein the at least one of the base and the platform deforms as the locking device moves from the unlocked configuration to the locked configuration.

In some aspects, the engaging member of the button includes a plurality of teeth extending away from the inner surface.

In some aspects, the engaging member of the button includes a non-circular protrusion extending away from the inner surface.

In some aspects, the connecting disk includes an opening having a shape corresponding to the shape of the non-circular protrusion of the engaging member of the button.

In some aspects, the connecting disk is fixed to or integral with the hub.

In some aspects, the body includes a flexible wall having a cone shaped in the expanded configuration.

In some aspects, the device further includes a case body sized to receive a portable electronic device, and wherein the platform is integrally formed with the case body.

DETAILED DESCRIPTION

Figure 1:
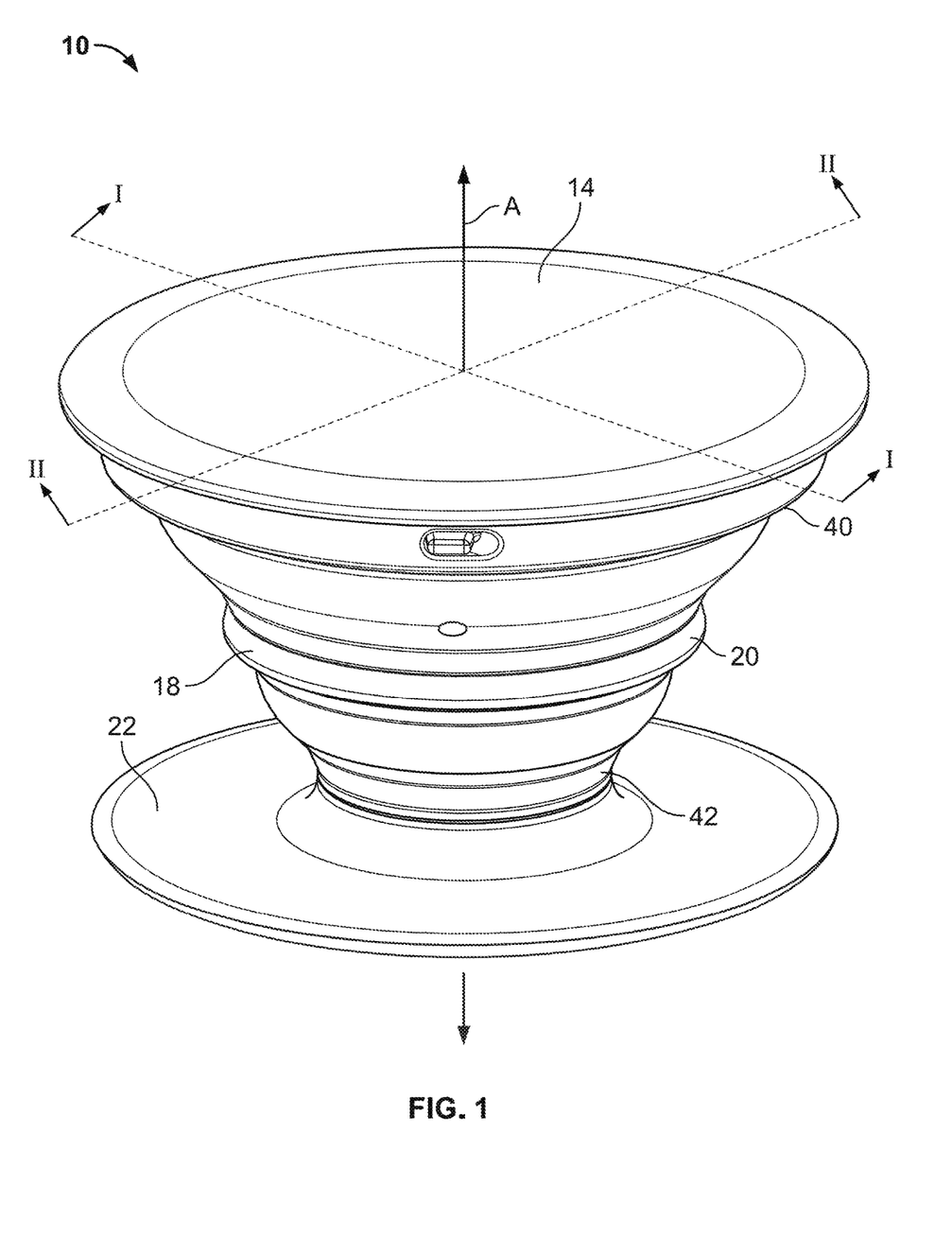
FIG. 1 is an isometric view of a first exemplary expandable device constructed in accordance with the teachings of the present disclosure.
Figure 2:
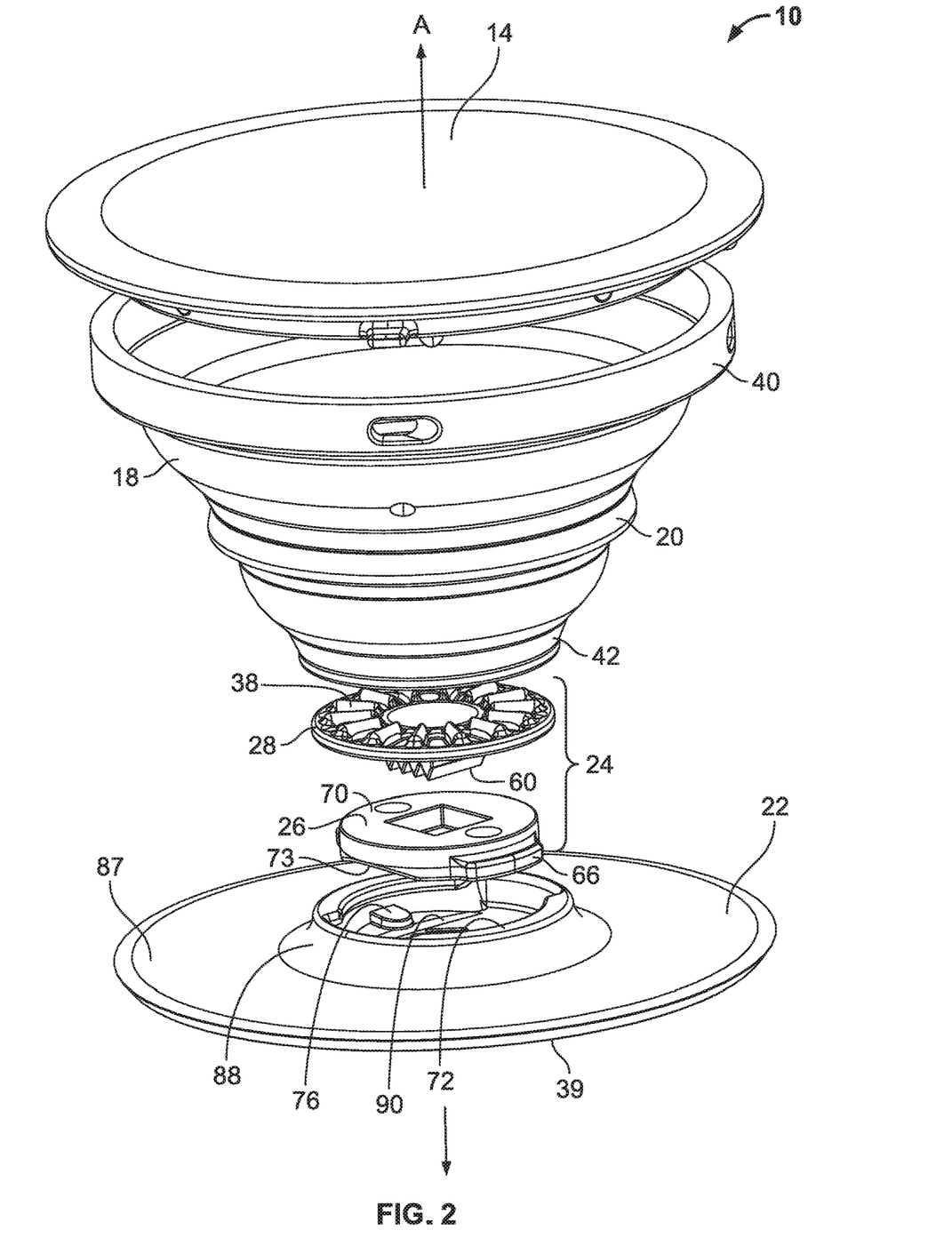
FIG. 2 is an exploded view of the expandable device of FIG. 1, including a first exemplary button, a first exemplary body including a first exemplary disk, a first exemplary hub, and a first exemplary platform.
Figure 3:
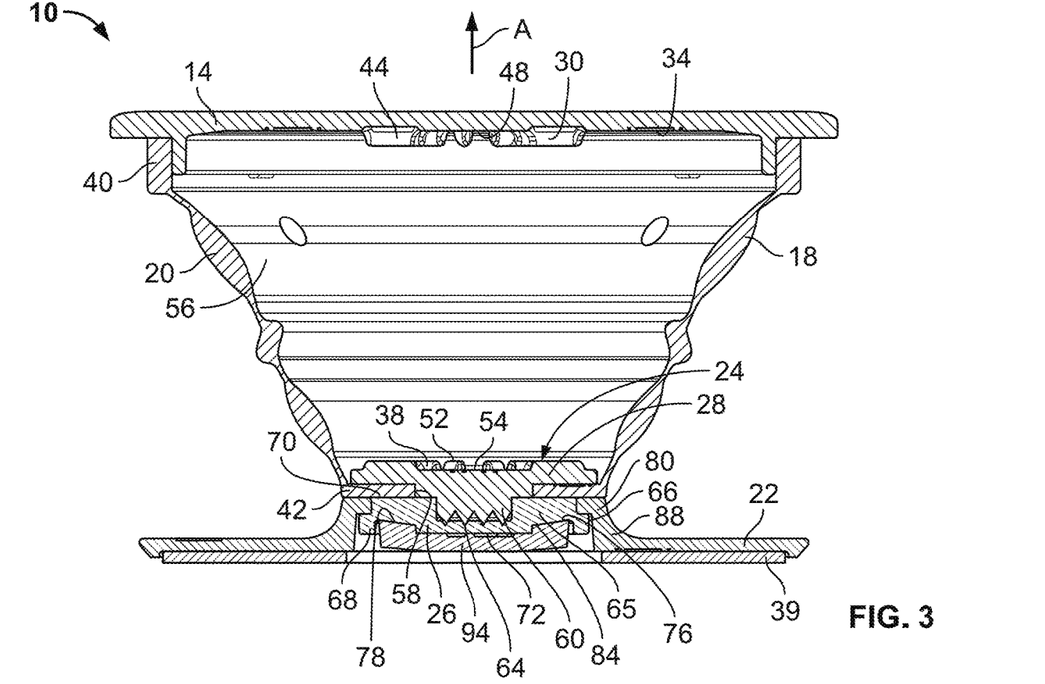
FIG. 3 is a front, cross-sectional view of the expandable device taken at I-I of FIG. 1.
Figure 4:
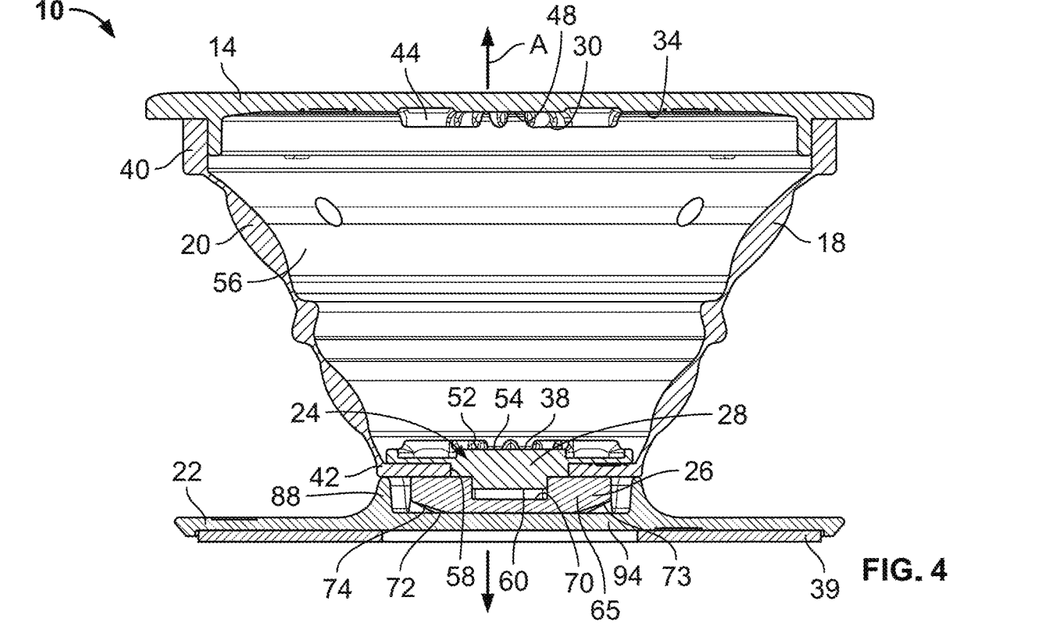
FIG. 4 is a side, cross-sectional view of the expandable device taken at II-II of FIG. 1.
Figure 5:
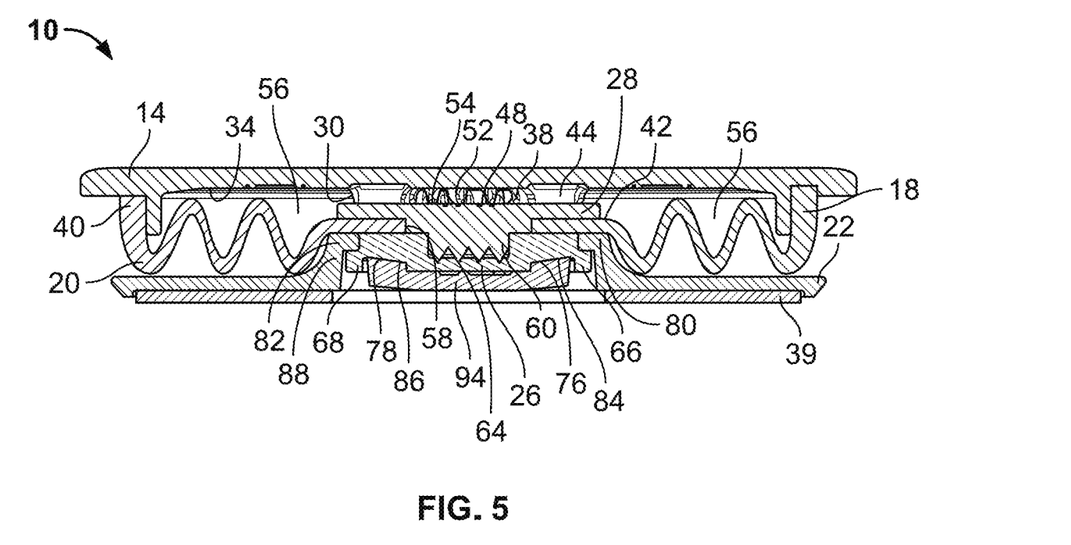
FIG. 5 is a front, cross-sectional view of the expandable device of FIG. 1 in a collapsed configuration.

In FIGS. 1-5, a first exemplary expandable device 10 is constructed in accordance with the teachings of the present disclosure. The expandable device 10 includes a button 14, a body 18 attached to the button 14, and a platform 22 that is attachable to a portable electronic device (not shown), a case for a portable electronic device, or other desired component. The body 18 is movable between an expanded configuration, as shown in FIGS. 1-4, and a collapsed configuration, as shown in FIG. 5. A locking device 24, which is hidden from view in FIG. 1 and is shown in FIG. 2, is disposed between the body 18 and the platform 22 to rotatably and releasably couple the body 18 to the platform 22. The locking device 24 is movable between an unlocked configuration, in which the body 18 is removable from the platform 22, and a locked configuration, in which the body 18 is secured to the platform 22. When the body 18 is in the expanded configuration, the body 18 may rotate freely about a longitudinal axis A relative to both the platform 22 and the locking device 24. The body 18 is configured to rotate with the locking device 24, and therefore move the locking device 24 from a locked configuration to an unlocked configuration, for example, only when the body 18 is in the collapsed configuration. As shown in FIGS. 3-5, an engaging member 30 carried by an inner surface 34 of the button 14 is configured to engage with a mating surface 38 of the locking device 24 when the device 10 in the collapsed configuration. When the button 14 and body 18 rotate about the longitudinal axis A in the collapsed configuration, the engaging member 30 of the button 14 engages the locking device 24 such that the locking device 24 is rotatable relative to the platform 22 between an unlocked configuration, in which the body 18 is removable from the platform 22, and a locked configuration, in which the body 18 is secured to the platform 22. The locking device 24 also rotates about the axis A relative to the platform 22 from the locked configuration to the unlocked configuration.

As shown in FIG. 2, the locking device 24 includes a hub 26 and a connecting disk 28 rotatably connected to the body 18. In the locked configuration, the body 18 is rotatable relative to the locking device 24 and therefore rotatably coupled to the platform 22 by way of the locking device 24.

The platform 22 has a mounting surface 39 that may include an adhesive adapted to attach the platform 22 to the portable device or the case for the portable device. The mounting surface 39 secures the platform 22 relative to the device to facilitate unlocking and locking the locking device 24. The hub 26, the connecting disk 28, the button 14, the body 18, and the platform 22 are aligned relative to the longitudinal axis A when the expandable device 10 is in the locked configuration.

The body 18 can include an accordion-like structure 18 having a collapsible wall 20. The body 18 is movable between the expanded configuration, as shown in FIGS. 1-4, and collapsed configuration, as shown in FIG. 5. The body 18 is symmetrical about the longitudinal axis A, and includes a first end 40 distal to the platform 22 and a second end 42 proximate to the platform 22. When the button 14 is attached to the first end 40 of the body 18, the wall 20 of the body 18 and the button 14 define a chamber 56. The body 18 includes an aperture 58 formed in the second end 42 of the body 18 such that the locking device 24 may be partially disposed both internally and externally relative to the body 18. At the second end 42 of the body 18, the chamber 56 has a volume sized to receive the connecting disk 28. The body 18 can be made of a flexible material, such as polyester-based thermoplastic polyurethane elastomer, that may be formed by injection molding, thermoforming, or compression molding, or may be any equivalently functional material suitable for its intended purpose. In some instances, the body 16 of the current disclosure may include, at least in part, a Pop-socket™ and/or an extending body for a portable media player as disclosed in U.S. Pat. No. 8,560,031, U.S. application Ser. No. 15/729,260, filed Oct. 10, 2017, U.S. application Ser. No. 15/864,402, filed Jan. 8, 2018, and U.S. application Ser. No. 15/864,509, filed Jan. 8, 2018, the entire disclosures of which are incorporated herein by reference.

As illustrated in FIGS. 3 through 5, the connecting disk 28 of the locking device 24 carried by the second end 42 of the body 18 and is disposed in the chamber 56 of the body 18 adjacent to the second end 42. In this configuration, the mating surface 38 of the connecting disk 28 faces the inner surface 34 of the button 14, and a second mating surface 60 extends through the aperture 58 of the second end 42 of the body 18 for coupling to the hub 26. The connecting disk 28 is disposed within the body 18 and is rotatable relative to the body 18. The connecting disk 28 rotates with the body 18 when the button 14 is attached to the first end 40 of the body 18 and engages with the first mating surface 38 of the connecting disk 28.

The engaging member 30 of the button 14 is particularly suited to connect with the mating surface 38 of the connecting disk 28. As such, locking device 24 of the device 10 is beneficially constructed so that the body 18 does not easily detach from the platform 22 when the device 10 is in use. The button 14 of the device 10 acts as a key to unlock or lock the body 18 from or to the platform 22 when the button 14 engages the locking device 24.

Figure 6:
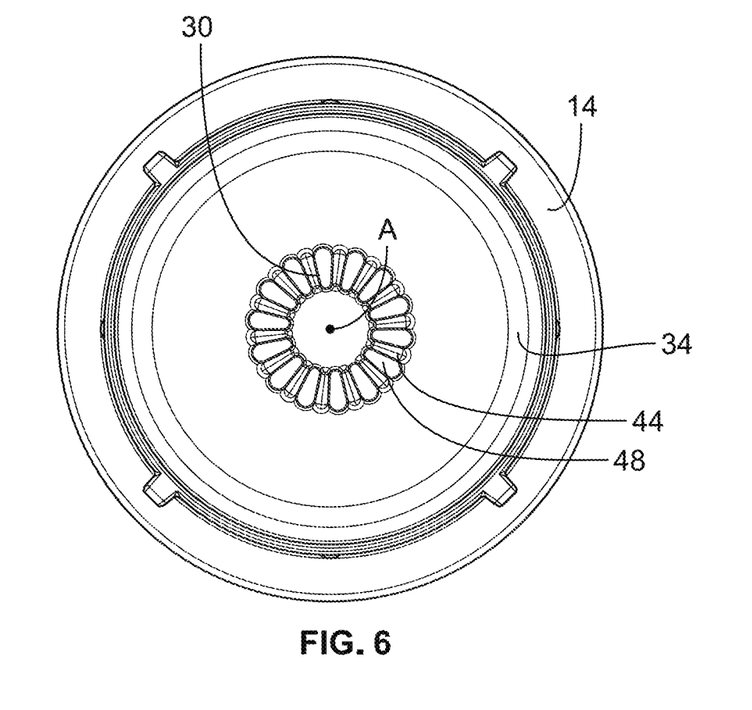
FIG. 6 is a bottom view of the button of FIG. 1.

As shown in FIG. 5, the engaging member 30 of the button 14 and the first mating surface 38 of the locking device 24 are arranged so that the engaging member 30 and the first mating surface 38 interlock (e.g., mesh, overlap, engage, mate, couple) when the inner surface 34 of the button 14 is adjacent to the mating surface 38. The inner surface 34 of the button 14 is shown in greater detail in FIG. 6. The engaging member 30 includes a plurality of protrusions 44 (e.g., teeth, ribs, studs, pegs, etc.) separated by a plurality of spaces 48 (e.g., grooves, notches, dimples, etc.), which may be arranged in a predetermined pattern or configuration that corresponds to the mating surface 38 of the connecting disk 28. In this example, the engaging member 30 includes a plurality protruding teeth 44 evenly spaced by the plurality of openings or grooves 48 in the shape of a ring. The engaging member 30 is disposed about the longitudinal axis A, and is symmetrical such that the button 14 may easily mesh with the first mating surface 38 of the connecting disk 28.

Figure 7:
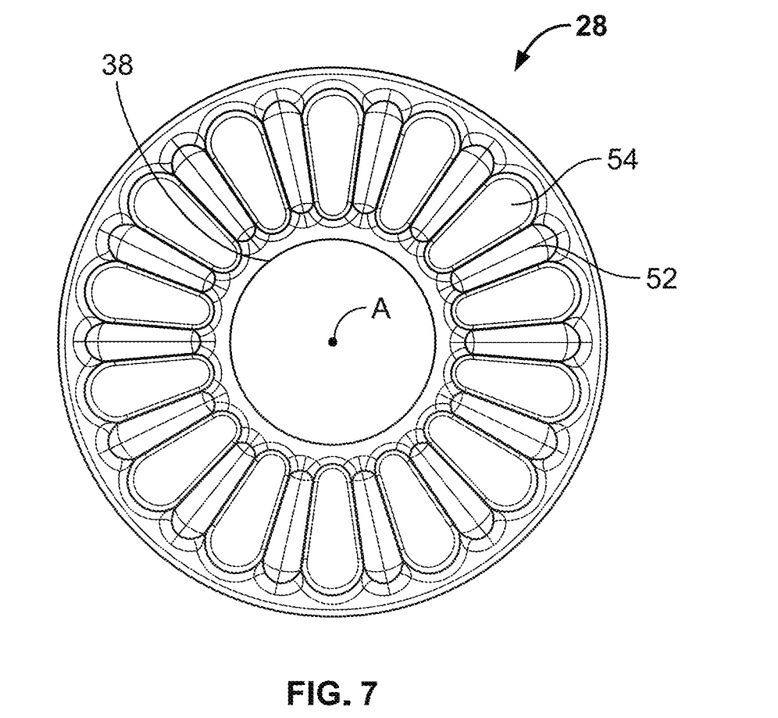
FIG. 7 is a top view of the connecting disk of FIG. 1.

FIG. 7 shows the mating surface 38 of the connecting disk 28 is arranged in a pattern of protruding teeth 52 (e.g., protrusions, ribs, studs, pegs, etc.), which are evenly spaced by a plurality of grooves 54 (e.g., spaces, notches, dimples, etc.). The first mating surface 38 is symmetrical about the longitudinal axis A such that the button 14 may easily mesh with the first mating surface 38 of the connecting disk 28. Turning back to FIGS. 3-5, the plurality of protrusions 52 of the connecting disk 28 are aligned, and sized to fit, within the spaces 48 of the engaging member 30 of the button 14. Likewise, the plurality of grooves 54 are aligned, and sized to receive, the plurality of protrusions 44 of the button 14. Thus, when the body 18 is in the collapsed configuration, the plurality of protrusions 44, 52 of the button 14 and the mating surface 38 of the locking device 24 are interlocked and positioned to engage when the button 14 is rotated about the longitudinal axis A. In another example, the mating surface 38 and the engaging member 30 interlock or otherwise engage via a different locking configuration.

Figure 8:
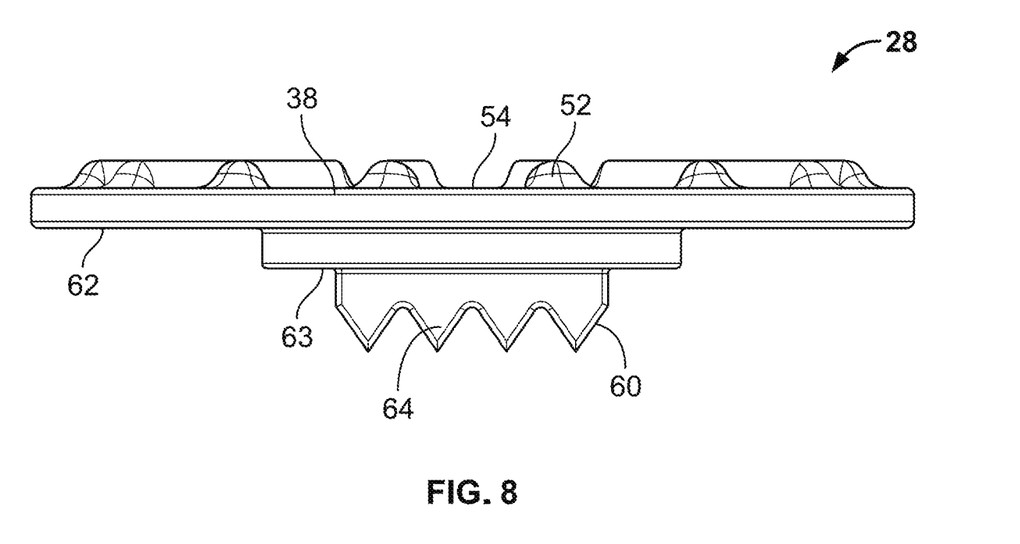
FIG. 8 is a side view of the connecting disk of FIG. 7.

In FIG. 8, the second mating surface 60 of the connecting disk 28 is shown. The second mating surface 60 includes a flat area 62, a protruding portion 63 surrounded by the flat area 62 and extending axially away from the flat area 62 of the disk 28. The flat area 62 is configured to lay flat against an interior surface of the second end 42 of the body 18 and the protruding portion 63 is configured to at least partially extend through the aperture 58 of the body 18. The flat area 62 includes a smooth surface to reduce friction between the disk 28 and the body 18 such that the connecting disk 28 is free to rotate relative to the body 18 when the disk 28 is disposed within the chamber 56. A distal end 64 of the protruding portion 63 includes a plurality of angled tips 64. The angled tips 64 may be configured to flex, bend, or otherwise deform to mate with the hub 26. Once the protruding portion 63 engages the hub 26, the hub 26 and the connecting disk 28 may be fixed (e.g., welded, fused, etc.) together to move as a unitary locking device 24. Alternatively, the hub 26 and connecting disk 28 can be integrally formed. Unlike the flat area 62, the distal end 64 may be a textured material configured to frictionally engage with the hub 26 so that the connecting disk 28 rotates the hub 26 when the disk 28 and hub 26 are engaged.

Figure 9:
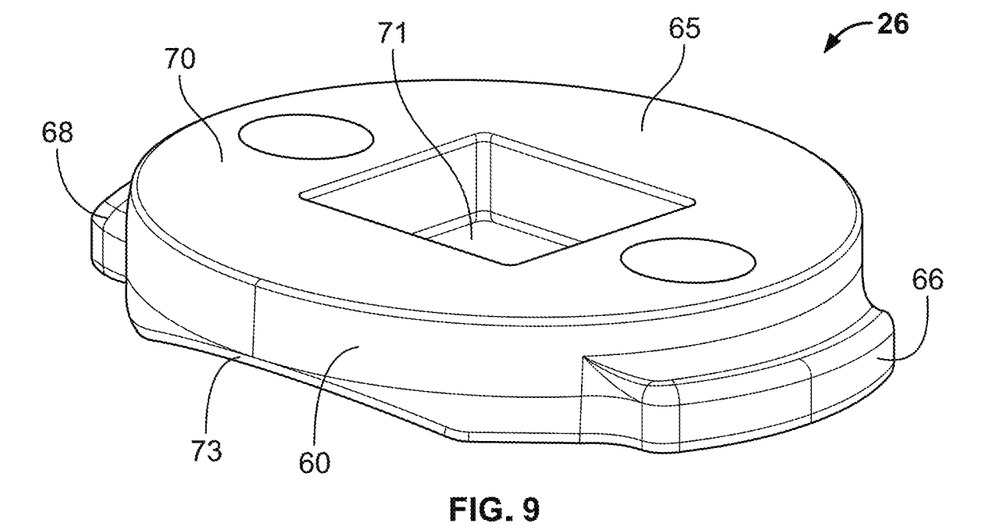
FIG. 9 is a isometric view of the hub of FIG. 1.
Figure 10:
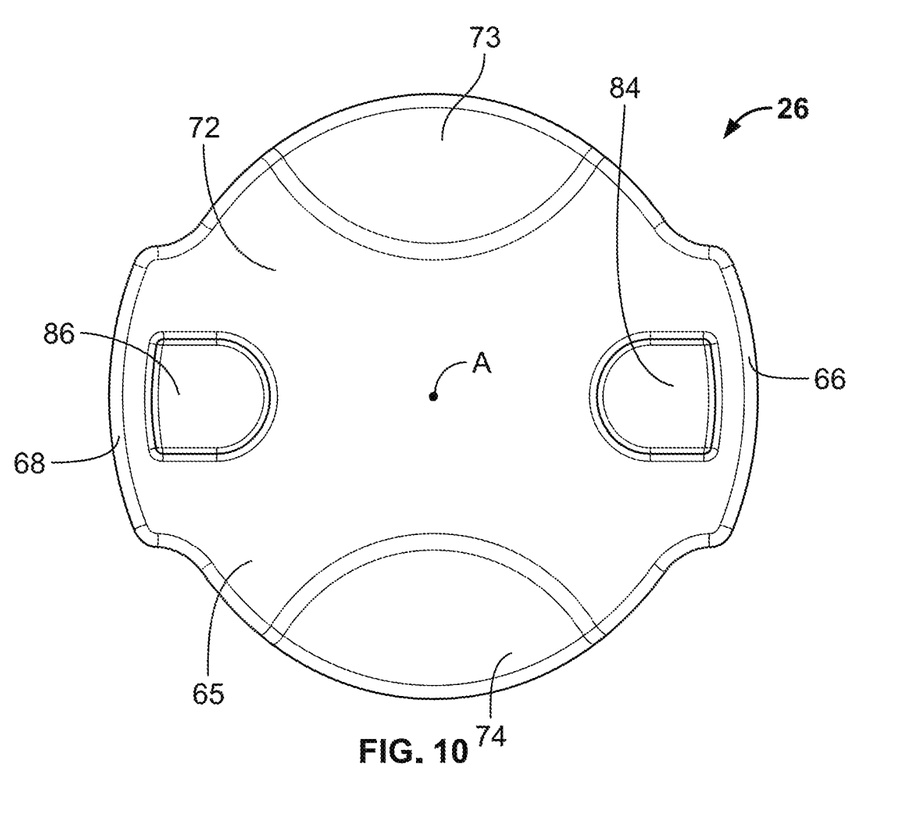
FIG. 10 is a bottom view of the hub of FIG. 9.

In FIGS. 9 and 10, the hub 26 is shown in greater detail. The hub 26 includes a body 65 and first and second radial wings 66 and 68 that extend outwardly from the body 65. The wings 66 and 68 are disposed on opposing sides of the body 65, and may be a resilient material such that the wings 66 and 68 may deform (e.g., bend, flex) when the wings 66 and 68 engage the platform 22. The body 65 includes a first surface 70 and a second surface 72 opposite the first surface 70. The first surface 70 is configured to mate with the second mating surface 60 of the connecting disk 28. More particularly, an opening 71 formed in the first surface 70 is sized and shaped to receive the protruding portion 63 of the second mating surface 60 of the connecting disk 28. As shown in FIG. 10, the hub 26 includes first and second curved notches or ramps 73, 74 formed in the second surface 72 to facilitate disengagement between the platform 22 and the hub 26 when the locking device 24 rotates relative to the platform 22. Specifically, the notches 73, 74 are formed to slide against protrusions 76, 78 extending from the platform 22 when the locking device 24 rotates a quarter turn (i.e., 90 degrees) about the longitudinal axis A. First and second detents 84, 86 are formed in the second surface 72 of the hub 26 and are shaped to engage with first and second protrusions 76, 78 of the platform 22 when the locking device 24 is in the locked configuration. In another example, the second surface 72 of the body 65 may have only one notch 73 or 74 or no notches. In the case where the hub 26 provide only one notch 73, the portion of the second surface 72 opposite disposed from the notch 73 may be flat or coplanar with the second surface 72. This configuration may facilitate removal of the body 18 from the platform 22. For example, as the locking device 24 is rotated out of locking engagement with the platform 22, the protrusion 76 or 78 of the base 22 may bias the second surface 72 of the hub 26 upward and away from the platform 22.

The hub 26 and the platform 22 are arranged to rotatably couple to lock the body 18 to the platform 22. The first and second wings 66 and 68 are deformable such that they may deflect from their original position when the wings 66 and 68 engage first and second shelves 80, 82 of the platform 22 as the locking device 24 moves from the unlocked configuration to the locked configuration. The detents 84, 86 formed in the second surface 72 of the hub 26 are configured to engage with the platform 22 in the locked configuration. Specifically, each detent 84, 86 is partially formed in one of the two wings 66, 68. It will be appreciated that the second shelf 82 is substantially similar to the first shelf 80 and the wing 68 is substantially similar to the wing 66, such that any details of the first shelf 80 and the first wing 66 discussed below apply equally to the second shelf 82 and the second wing 68, respectively. In the illustrated expandable device 10, the locking device 24 includes two wings 66 and 68 and the platform 22 includes two shelves 80 and 82 corresponding to the wings 66 and 68 of the locking member 24. However, in another example device, the locking device 24 may have one wing or more than two wings, and the platform 22 may have the same number of corresponding shelves. Likewise, the platform 22 includes two protrusions 76, 78 and the hub 26 includes two detents 84, 86 corresponding to the protrusions 76, 78. However, in another example device, the hub 26 may include one detent or more than two detents, and the platform may have the same number of corresponding protrusions. The hub 26 is preferably made of a durable plastic, such as polyethylene, or a harder plastic, such as polycarbonate, that may be formed by injection molding, thermoforming, or compression molding, but may instead be formed of any other suitable and durable material including thermoplastic polyurethane, metal, fiberglass, or any combination of these materials, or any equivalently functional materials suitable for its intended purpose.

As shown in FIGS. 3-5, the hub 26 is coupled to the platform 22 when the locking device is in the locked configuration. The platform 22 includes an outer surface 87 and a collar 88 extending away from the surface 87. The collar 88 defines a cavity 90. The second shelf 82 oppositely disposed from the first shelf 80 is configured to slidably receive one of the wings 66 and 68 of the hub 26. The shelves 80 and 82 are configured to engage one of the wings 66 and 68 of the locking member 24 when the locking member 24 is in the locked configuration. A surface of each shelf 80 and 82 inhibits axial movement of the locking device 24 relative to the platform 22 when the locking device 24 is in the locked configuration. The first and second wings 66 and 68 move out of engagement with the shelves 80 and 82 when the hub 26 is rotated.

Figure 11:
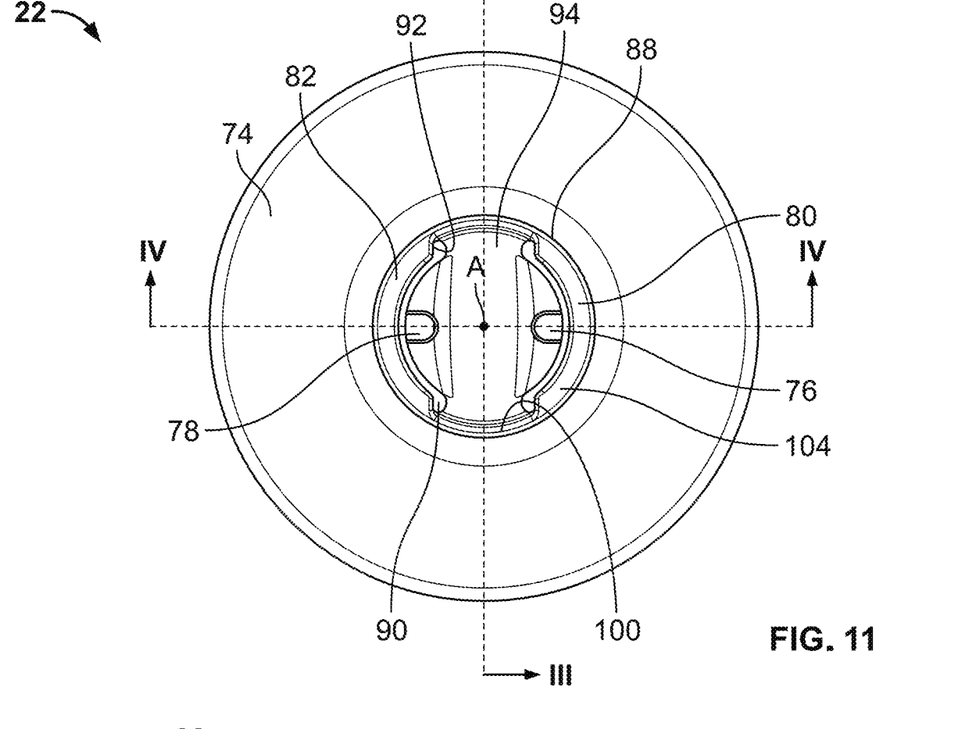
FIG. 11 is a top view of the platform of FIG. 1.
Figure 12:
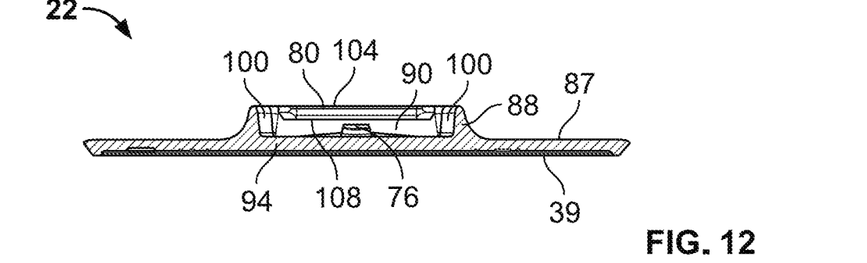
FIG. 12 is a side, cross-sectional view of the platform taken at III-III of FIG. 9.
Figure 13:
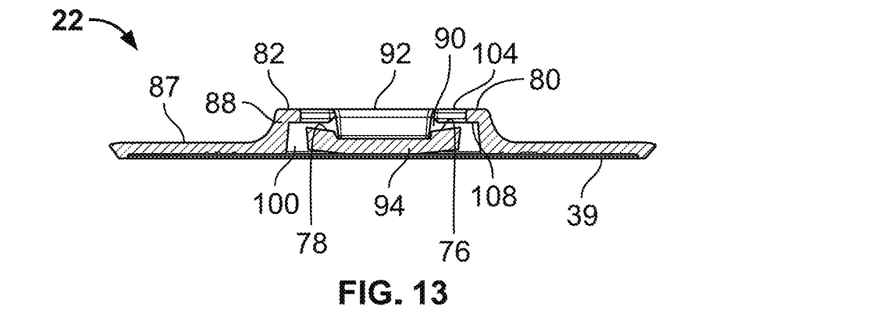
FIG. 13 is a front, cross-sectional view of the platform taken at IV-IV of FIG. 9.

As illustrated in FIGS. 11 through 13, the first exemplary platform 22 includes the first shelf 80 extending radially inwardly from the collar 88 and into a cavity 90 formed in the platform 22. At least a portion of the locking device 24 is adapted to be removably disposed in the cavity of the platform 22 for releasably coupling the body 18 to the platform 22. The cavity 90 is partially defined by a non-circular opening 92, as shown in FIG. 11, and is shaped to receive the first and second wings 66 and 68 of the hub 26. In particular, the opening 92 is defined by first and second opposing shelves 80, 82, and an interior wall 100 of the collar 88. The platform 22 also includes a base 94 that is recessed from the collar 88 and defines a lower boundary of the cavity 90 of the platform 22. The base 94 is connected to an inner wall 100 of the platform 22 such that the base 94 may be co-planar with the mounting surface 39 of the platform 22, as shown in FIG. 12. The base 94 also includes first and second protrusions 76, 78 extending axially into the cavity 90 and spaced radially inwardly relative to the shelves 80, 82, respectively. The base 94 is connected to the inner wall 100 at opposing ends, which are 90 degrees offset from the first and second shelves 80, 82. Above the opposing ends of the base 94, the collar 88 defines a radially recessed inner wall 100, providing a clearance for the hub 26. So configured, the radial wings 66, 68 of the hub 26 may slide into the opening 92 until the radial wings 66, 68 are beneath a reference plane on which the shelves 80, 82 are disposed. The base 94 is disconnected from the inner wall 100 directly below the first and second shelves 80, 82 such that the base 94 may flex downward relative to the shelves 80, 82 when the second surface 72 of the hub 26 engages the base 94.

As shown in FIGS. 12 and 13, the first shelf 80 of the platform 22 includes a first surface 104 that faces the second end 42 of the body 18, and a second surface 108 that engages with one of the first and second wings 66 and 68 of the locking member 24 when the locking member 24 moves from the unlocked configuration to the locked configuration. The platform 22 is preferably made of a durable plastic, such as polyethylene, or a harder plastic, such as polycarbonate, that may be formed by injection molding, thermoforming, or compression molding, but may instead be formed of any other suitable and durable material including thermoplastic polyurethane, metal, fiberglass, or any combination of these materials, or any equivalently functional materials suitable for its intended purpose.

To couple the locking member 24 to the platform 22, the hub 26 is disposed through the opening 92 and into the cavity 90 of the platform 22 such that the locking member 24 is at least partially disposed below first and second shelves 80, 82. The locking member 24 is rotated (e.g., 90 degrees) in either the clockwise or counterclockwise direction about the longitudinal axis A. As the locking member 24 is rotated, the first wing 66 of the hub 26 of the locking member 24 slides against the shelf 80 of the platform 22 until the protrusion 76 of the base 94 snaps into the detent 84 of the second surface 72 of the hub 26. Additionally, the hub 26 may deflect or displace the base 94 until the protrusion 76 and the detent 84 are engaged. The base 94 may be a resilient material such that the base 94 may deform (e.g., bend, flex) when engaged by the hub 26. In one example, the base 94 may bend or flex along a flexible hinge formed in the base 94 extending between opposing sides of the inner wall 100 (i.e., where the base 94 connects to the platform 22. It will be appreciated that the second shelf 82 is substantially similar to the first shelf 80, the second wing 68 is substantially similar to the first wing 66, the second detent 86 is substantially similar to the first detent 84, and the second protrusion 78 is substantially similar to the first protrusion 76, such that any details of the first shelf 80, first wing 66, first detent 84, and the first protrusion 76 discussed above apply equally to the second shelf 82, the second wing 68, the second detent 86, and the second protrusion 78, respectively.

The mating relationships between the button 14 and the connecting disk 28, the connecting disk 28 and the hub 26, and the hub 26 and the platform 22 may be configured to provide any number of different mating engagements. For example, the hub 26 may include one or more protrusions extending from its second surface 72 to couple to one or more detents formed in the base 94 of the platform 22. In another example, the second mating surface 60 of the connecting disk 28 may not extend through the aperture 58 formed in the second end 42 of the body 18, but instead, the first surface 70 of the hub 26 may include a portion that extends into the aperture 58 of the body 18 to couple with the second mating surface 60 of the connecting disk 22. Non-limiting examples of the configuration or mating relationship between the locking member 24 and the platform 22 and/or other components of the device 10 are disclosed in U.S. application Ser. No. 15/864,402, filed Jan. 8, 2018, and U.S. application Ser. No. 15/864,509, filed Jan. 8, 2018, the entire disclosures of which are incorporated herein by reference.

The expandable device 10 may be moved from the locked configuration to the unlocked configuration by overcoming the frictional forces between the mating surfaces of the locking device 24 and the platform 22. Generally speaking, a user of the expandable device 10 may rotate the locking device 24 from the locked configuration to the unlocked configuration by collapsing the expandable device 10 such that the button 14 engages with the connecting disk 28 of the locking device 24, and then by grabbing or grasping the button 14 or body 18 and moving, e.g., rotating or twisting, the button 14 or body 18 a quarter turn (i.e., 90 degrees) in either the clockwise or counterclockwise direction about the longitudinal axis A. The button 14 engages with the locking device 24 to rotate the locking device 24 with the button 14 and body 18. In turn, the connecting disk 28 transfers the rotational motion from the button 14 to rotate the hub 26 of the locking device 24 out of engagement with the platform 22. Once the locking member 24 is in the unlocked configuration, the user may pull the body 18 away and out of the cavity 90 and through the opening 92 of the platform 22 to lock the body 17 to the platform 22.

The device 10 may be assembled by connecting the connecting disk 28 to the second end 42 of the body 18 by disposing the connecting disk 28 into the chamber 56 of the body 18. The second mating surface 60 is coupled to the first surface 70 of the hub 26 such that the hub 26 and the connecting disk 28 form a unitary locking device 24. The body 18 may be coupled to the platform 22 by disposing the hub 26 into the cavity 90 of the platform 22.

Figure 14:
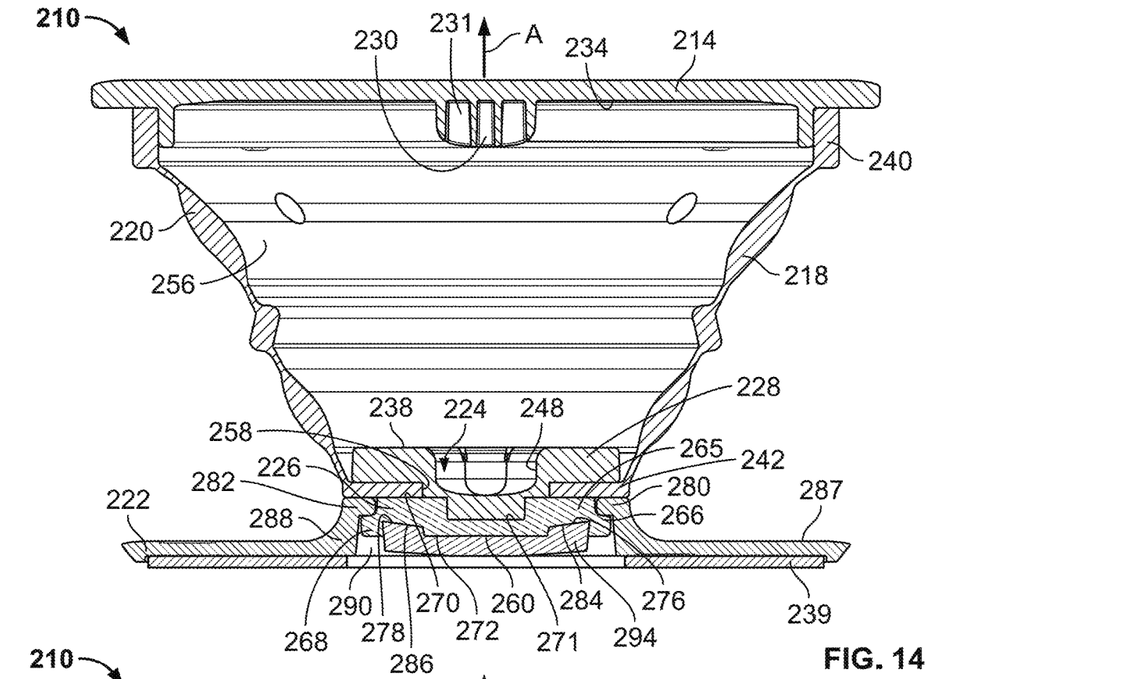
FIG. 14 is a front, cross-sectional view of a second exemplary expandable device constructed in accordance with the teachings of the present disclosure.
Figure 15:
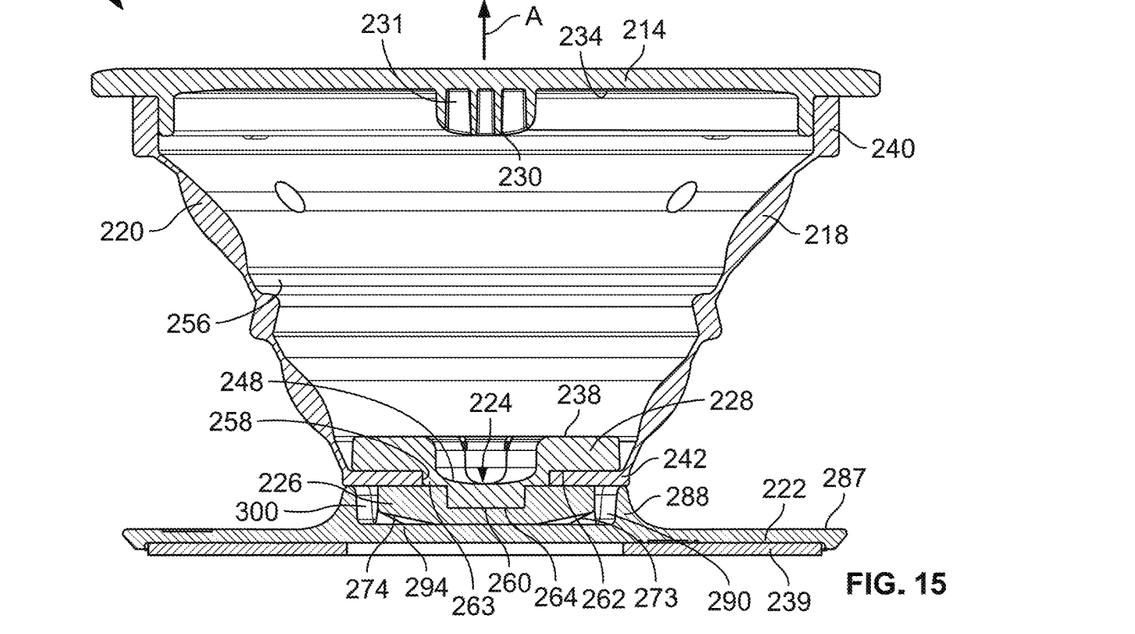
FIG. 15 is a side, cross-sectional view of the expandable device of FIG. 14.

FIGS. 14 and 15 illustrate a second exemplary device 210 constructed in accordance with the teachings of the present disclosure. The second exemplary device 210 is similar to the device 10 of FIGS. 1-5. Thus, for ease of reference, and to the extent possible, the same or similar components of the second exemplary device 210 will retain the same reference numbers as outlined above with respect to the first exemplary device 10, although the reference numbers will be increased by 200. However, the second exemplary device 210 is different from the device 10 in the manner described below.

Figure 16:
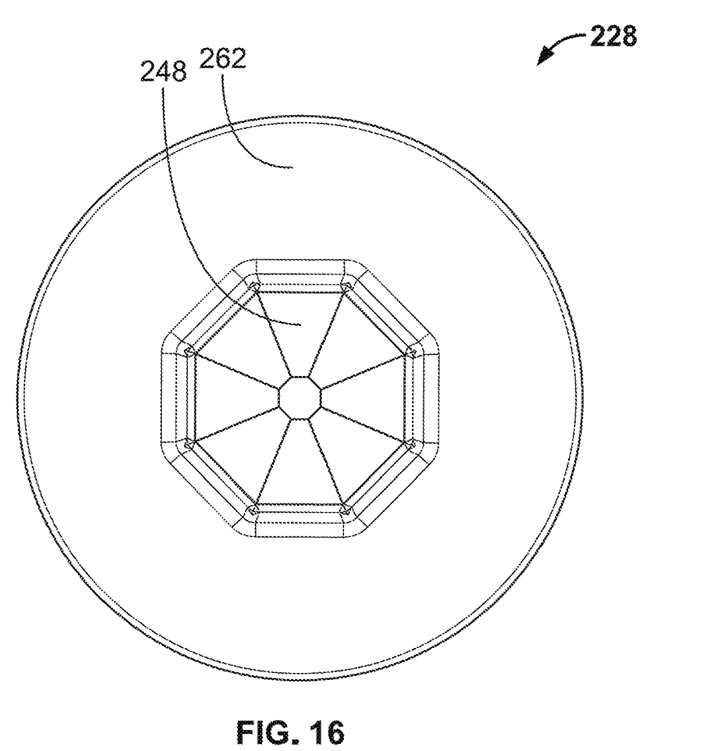
FIG. 16 is a top view of a second exemplary connector of the expandable device of FIG. 14.

A button 214 of the second exemplary device 210 includes an engaging member 230 having a non-circular cross-sectional shape. The engaging member 230 includes a plurality of sides 231 configured to engage with a corresponding opening 248 or indentation formed in a first mating surface 238 of a locking device 224. As shown in FIG. 16, a connecting disk 228 of the locking device 224 includes the first mating surface 238 having a non-circular shape sized to receive the engaging member 230 of the button 214 when the device 210 is in a collapsed configuration. A body 218, a platform 222, and a hub 226 may be substantially similar to the body 18, platform 22, and hub 26 of the first exemplary device 10 previously described with reference to FIGS. 1-13. The mating surface 238 of the locking device 224 and the engaging member 230 of the button 214 may be any number of shapes and structures that facilitate engagement between the locking device 224 and the button 214.

Figure 17:
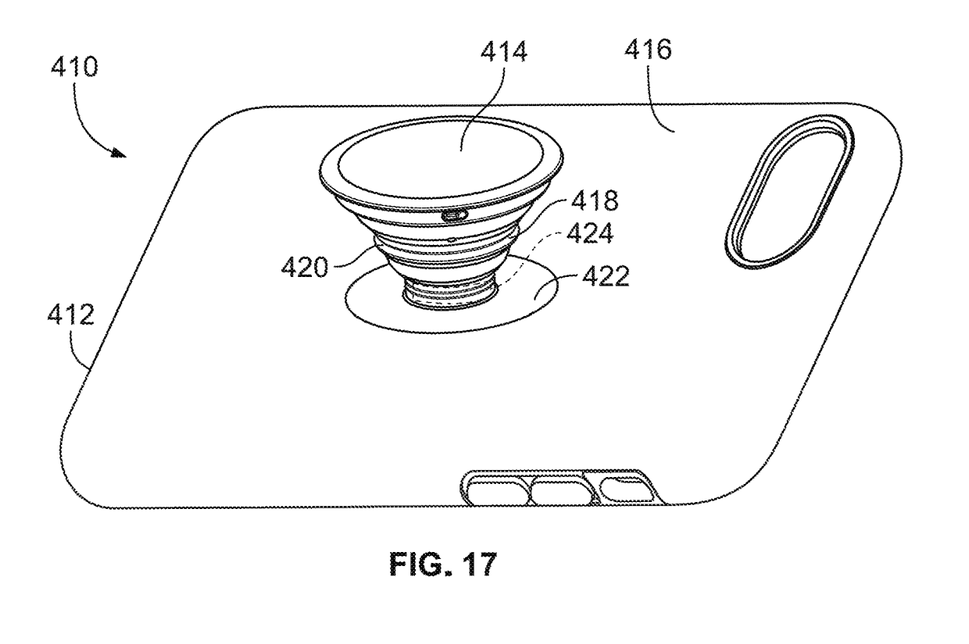
FIG. 17 is an isometric view of a case for a portable electronic device having an integrated expandable device constructed in accordance with the teachings of the present disclosure.

FIG. 17 illustrates a third exemplary device 410 constructed in accordance with the teachings of the present disclosure. The third exemplary device 410 of FIG. 17 is an example of how either the platform 22 of the first exemplary expandable device 10 or the platform 222 of the third exemplary expandable device 210 may be integrally formed or permanently attached to a case body 412 of a portable device 410. Thus, for ease of reference, and to the extent possible, the same or similar components of the third exemplary device 410 will retain the same reference numbers as outlined above with respect to the first exemplary device 10, although the reference numbers will be increased by 400. As shown in FIG. 17, the quick-release expandable device 410 is a protective case integrated with a platform 422 such that a body 418 of the expandable device 410 is removably coupled to a case body 412 by way of the integrated platform 422. The platform 422 may be embedded with an outer wall 416 of the case body 412, and may be formed with the case body 412 by injection molding, thermoforming, compression molding, or other techniques, such as additive manufacturing techniques. In another example, the case body 412 may be formed first and then the platform 422 may be permanently secured to the case body 412 such that the case body 412 and the platform 422 are inseparable. In some versions, the platform is formed integral with the case body as opposed to a separate component attached to the case body.

The quick-release expandable devices 10, 210, 410 for a portable device, such as a portable media player, constructed in accordance with the present disclosure provide a platform 22, 222, 422 that attaches directly to a portable device or to a protective case of the portable device. The platform 22, 222, 422 permits the body 18, 218, 418 to easily couple to and remove from the platform 22, 222, 422 and, if desired, replaced with a different body 18, 218, 418. The body 18, 218, 418 of the device 10, 210, 410 is coupled to the locking device 24, 224, 424 (shown in dashed lines in FIG. 17) that is removably coupled to the platform 22, 222, 422. Each of the platform 22, 222, 422, locking device 24, 224, 424 and button 14, 214, 414 may be designed in a variety of shapes and sizes to facilitate slidably locking and slidably releasing the body 18, 218, 418 to the platform 22, 222, 422.

The figures and description provided herein depict and describe preferred examples of an expandable device for purposes of illustration only. One skilled in the art will readily recognize from the foregoing discussion that alternative examples of the components illustrated herein may be employed without departing from the principles described herein. Thus, upon reading this disclosure, those of skill in the art will appreciate still additional alternative structural and functional designs for expandable accessories. Thus, while particular examples and applications have been illustrated and described, it is to be understood that the disclosed examples are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. An expandable device for use with a portable electronic device, the expandable device comprising:
   a body including a first end, a second end, and a longitudinal axis, the body movable between an expanded configuration and a collapsed configuration;
   a button coupled to the first end of the body;
   a platform including an outer surface and a collar extending away from the outer surface, the collar defining a cavity; and
   a locking device carried by the second end of the body, at least a portion of the locking device adapted to be removably disposed in the cavity of the platform for releasably coupling the body to the platform,
   wherein the locking device is rotatable relative to the platform between an unlocked configuration, in which the body is removable from the platform, and a locked configuration, in which the body is secured to the platform.

2. The device of claim 1, wherein the button includes an inner surface and an engaging member carried by the inner surface, the engaging member of the button engages the locking device such that the button and the locking device can rotate together.

3. The device of claim 1, wherein the locking device includes a connecting disk and a hub attached to the connecting disk, the hub is coupled to the platform when the locking device is in the locked configuration and removable from the platform when the locking device is in the unlocked configuration.

4. The device of claim 3, wherein the connecting disk is adjacent to the second end of the body, the connecting disk including a first mating surface adapted to engage the engaging member of the button and a second mating surface adapted to connect to the hub.

5. The device of claim 3, wherein the hub includes a body having a first surface adapted to connect to the connecting disk, a second surface adapted to couple to a first portion of the platform, and a radial wing extending from the body of the hub and adapted to engage a different portion of the platform.

6. The device of claim 5, wherein the platform includes a protrusion extending into the cavity, the protrusion adapted to couple to the second surface of the hub when the locking device is in the locked configuration.

7. The device of claim 6, wherein the hub is configured to slide against the protrusion of the platform, and wherein the platform is configured to deform when the locking device moves between the unlocked configuration and the locked configuration.

8. The device of claim 6, wherein the platform includes a base recessed from the collar and at least partially defining the cavity such that the cavity is disposed between the collar and the base of the platform, and wherein the protrusion is formed in the base.

9. The device of claim 8, wherein the platform includes a shelf extending inwardly into the cavity from the collar, the shelf configured to engage the radial wing of the hub when the locking device is in the locked configuration.

10. The device of claim 9, wherein the radial wing of the hub is disposed beneath the shelf of the platform when the locking device is in the locked configuration.

11. The device of claim 9, wherein at least one of the base of the platform and a portion of the hub is a resilient material and is deformable, wherein the at least one of the base and the platform deforms as the locking device moves from the unlocked configuration to the locked configuration.

12. The device of claim 4, wherein the engaging member of the button includes a plurality of teeth extending away from the inner surface.

13. The device of claim 4, wherein the engaging member of the button includes a non-circular protrusion extending away from the inner surface.

14. The device of claim 13, wherein the connecting disk includes an opening having a shape corresponding to the shape of the non-circular protrusion of the engaging member of the button.

15. The device of claim 1, wherein the connecting disk is fixed to or integral with the hub.

16. The device of claim 1, wherein the body includes a flexible wall having a cone shaped in the expanded configuration.

17. The device of claim 1, further comprising a case body sized to receive a portable electronic device, and wherein the platform is integrally formed with the case body.

* * * * *